(12) United States Patent
Scott et al.

(10) Patent No.: US 6,952,759 B2
(45) Date of Patent: *Oct. 4, 2005

(54) MEMORY ACCESS CONTROL SYSTEM, APPARATUS, AND METHOD

(75) Inventors: Greg E. Scott, Higley, AZ (US); Jenny M. Pelner, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/628,772

(22) Filed: Jul. 28, 2003

(65) Prior Publication Data

US 2004/0024980 A1 Feb. 5, 2004

Related U.S. Application Data

(63) Continuation of application No. 09/902,998, filed on Jul. 11, 2001, now Pat. No. 6,615,329.

(51) Int. Cl.$^7$ .............................................. G06F 12/00
(52) U.S. Cl. ...................................... 711/163; 711/164
(58) Field of Search ............................... 711/163, 164, 711/152

(56) References Cited

U.S. PATENT DOCUMENTS

| | | | |
|---|---|---|---|
| 4,280,176 A | 7/1981 | Tan | 364/200 |
| 6,253,281 B1 * | 6/2001 | Hall | 711/112 |
| 6,285,583 B1 | 9/2001 | Cleveland et al. | 365/185.04 |
| 6,523,103 B2 * | 2/2003 | Page | 711/173 |
| 6,615,329 B2 * | 9/2003 | Scott et al. | 711/163 |

* cited by examiner

Primary Examiner—Mano Padmanabhan
Assistant Examiner—Mehdi Namazi
(74) Attorney, Agent, or Firm—Schwegman, Lundberg, Woessner & Kluth, P.A.

(57) ABSTRACT

Articles, methods, apparatus, and systems to control access to a protected area of a memory are disclosed.

25 Claims, 5 Drawing Sheets

MEMORY ACCESS CONTROL SYSTEM, APPARATUS, AND METHOD

This application is a continuation of U.S. patent application Ser. No. 09/902,998, filed Jul. 11, 2001 now U.S. Pat. No. 6,615,329, which is incorporated herein by reference.

TECHNICAL FIELD

The present invention relates generally to software and hardware mechanisms which provide access to computer memories.

BACKGROUND

As the television (TV) and the personal computer (PC) converge to become a single, integrated appliance, high-speed networks continue to mature and digital video applications provide greater interactivity and personalization for individual users. Such applications include interactive video, real-time feeds, and digital video broadcasting, usually a streaming digital video technology. To produce such applications, the video content may be initially recorded in a digital format, or in an analog format, and then converted to a digital format. After being stored, the content can then be requested for transmission. A server can be a computer streaming the stored video content, while a client may be the device that receives and displays the streamed video data. Set-top clients can be designed as client devices to be placed on top of a TV set, enabling consumers to access streaming digital video content without using a separate computer.

Consumers are used to the reliability of conventional TV sets and Digital Video Disk (DVD) players; they expect set-top clients, as a "black box", to behave in a similar error-free fashion. In other words, most consumers believe that turning on the power to a set-top client device should provide perfect operation, including flawless delivery of streamed digital video data. Unfortunately, power glitches and power failures can lead to corrupted memory, which in turn may lead to failures in set-top client performance. Since set-top clients are often part of a computer network (communicating with a server), software virus activity may also act to corrupt the memory in the set-top client.

To overcome these problems, some designers have included non-volatile memory, such as flash memory, in their set-top client designs. The non-volatile memory is used to contain a boot loader and some type of Recovery Operating System (ROS) to aid in recovery from major operating system software corruption. Some manufacturers of flash memories also provide for register control of block write protection for pre-assigned areas, such as those where the boot loader and ROS reside. Thus, even if the regular operating system (i.e., the Client Operating System or COS) in the flash memory is corrupted due to a power outage or hacker activity, the set-top client device can still boot properly at the next power-up cycle, assuming that block write protection operates so that the boot loader and ROS are still intact.

Unfortunately, the advantage of semi-permanent block write protection (which allows a selected series of software commands to write over the boot loader and ROS areas when upgrades are desired, for example) comes at the cost of the continued possibility for corruption. Even though some flash memory devices include a "lock-down" command which requires a second level of register access for un-locking protected blocks of memory, the lock-down mode is cleared whenever the memory device is reset or powered-down. Therefore, even with the extended block protection modes offered by newer flash memory devices, it is still possible for hackers to access the known (published) enabling register locations in the flash memory so as to turn off block protection and change the content of the boot loader and ROS. Thus, there is a need in the art for apparatus, systems, and methods which can be easily applied to control access to protected memory areas.

DETAILED DESCRIPTION

In the following detailed description, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice them. Other embodiments may be utilized and derived therefrom, such that structural, logical, and electrical circuit substitutions and changes can be made. The following detailed description, therefore, is not to be taken in a limiting sense, and the scope of various embodiments is defined only by the appended claims, along with the full range of equivalents to which such claims are entitled.

According to the teachings of various embodiments, methods, circuits, apparatus, systems and articles to control access to a protected area of a memory are described. Some methods include detecting an attempt to write to the protected area, determining whether a write authorization flag (not necessarily located in the protected area) has been set by software located in the protected area (e.g., software authorizing writes to the same memory location where it resides). If the flag has been set, the attempted write operation may be enabled. The circuits, apparatus, and systems may be embodied by various combinations of software and hardware, such that a write detection module may alert a processor module of attempts to write to a protected area, the processor module can determine whether the write operation has been authorized by checking the state of an authorization flag (not necessarily located in the protected area), and the write operation to the protected area may be enabled if, or only if the authorization flag has been set.

Advantages provided by the invention include providing a more robust protection mechanism than was previously available, especially as applied to flash memories, such that power-up and power-down operations do not make protected area memory modification simply a matter of writing to registers in the protected memory. In addition, writes to the protected area can be controlled by allowing them only when authorized by the operation of instructions located in the protected area itself.

Figure 1:
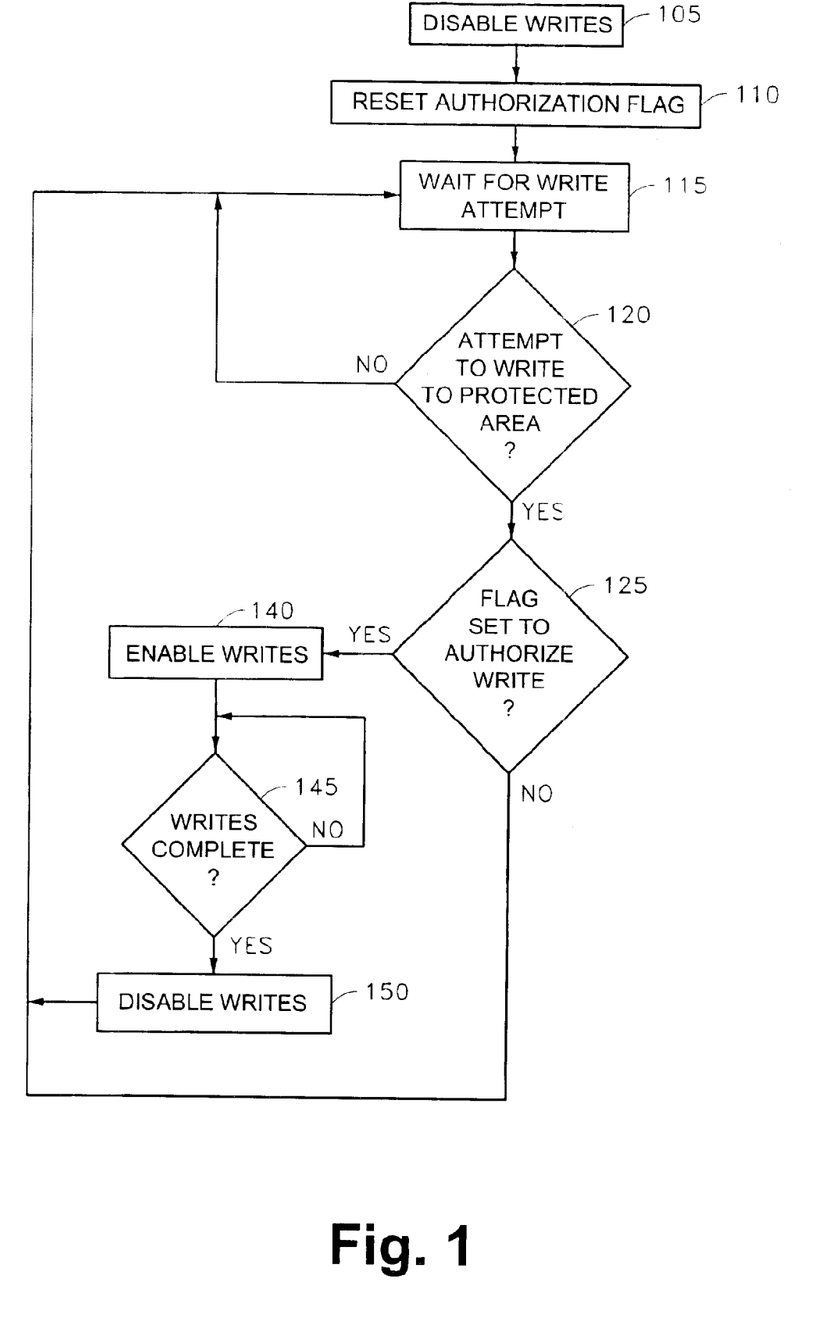
FIG. 1 is a flow chart diagram of a method of controlling access to a protected area of a memory according to the teachings of the present invention.

Referring now to FIG. 1, a flow chart diagram of a method for controlling access to a protected area of a memory according to the teachings of the present invention can be seen. The method begins, optionally, by disabling all write operations to the protected area of the memory (block 105). For example, if the protected memory area is located within a flash memory, similar to or identical to an Intel 28F128J3, this may be accomplished by forcing the input to the program/erase voltage switch (i.e., the VPEN input) to a LOW logic state. The method then continues with resetting the write authorization flag (block 110). Typically, the flag is a bit located in a memory which is physically separated from the memory which includes the protected area. Resetting the bit involves using a series of software instructions, or program code located within the protected memory area to clear the flag, such as by recording a value of "zero" in the memory location bit which may be assigned to the flag.

After the flag is reset, the method continues by waiting to detect any type of attempted memory write activity directed toward the protected memory area (block 115). This may occur, for example, by monitoring various signal lines connected to the memory having the protected area. In the exemplary case of a flash memory, such as the Intel 28F128J3, this can be accomplished by monitoring the state of several of the address lines (e.g., A20, A21, A22, and A23) and the VPEN write enable input. If all of the monitored address lines and the VPEN input are active, then an attempt is being made to write to the protected memory area, since, considering the current example, the VPEN input must be placed in a HIGH logic state to complete a write operation to the flash memory. Of course, if no attempt to write to the protected area is detected, then no action need be taken, and the method continues to wait until an attempt is made to write to the protected area (blocks 115 and 120).

Once an attempt to write to the protected area occurs, the method continues with checking the state of the write authorization flag to determine whether writes to the protected area have been properly authorized (block 125). As mentioned above, the only program code with the ability to change the state of the write authorization flag resides in the protected area itself. Since this area can only be written when authorized, there is no way to modify the content of the area unless the approved code which resides in the protected area allows such access to occur. It is this self-validating mechanism which provides the essential security of the invention.

If the write authorization flag is not set so as to authorize write operations to the protected area (as determined in block 125), then no further action need be taken. Carrying out the method at this point simply means that no action will be taken to enable write operation activity to the protected area. Even if write operations to the protected area proceed due to initiation from another part of the system, such as from a peripheral, no memory locations within the protected area will be changed, since the VPEN input has already been forced into a LOW logic state (see block 105). However, if it is determined in block 125 that the authorization flag has been set so as to permit writing to the protected area (typically using a set of software code instructions not located in the protected area to set the flag), then write operations, including the attempted write operation, will be enabled (block 140). For the exemplary Intel 28F128J3 flash memory noted previously, this may be accomplished by either actively moving the input to the program/erase voltage switch (i.e., the VPEN input) to a HIGH state, or passively allowing the VPEN input to be moved to a HIGH state. In either case, one or more write operations may then proceed, until all writes to the protected area are completed (as determined in block 145). This can be accomplished, for example, by using the instructions resident within the protected area to trigger a particular type of interrupt after the desired number of write operations have been completed. Until the interrupt is triggered, for example, write operations to the protected area are allowed to continue (block 145). However, once the interrupt is triggered, write operations are disabled (block 150). Again, to use the example of the Intel 28F128J3 flash memory, this may be accomplished by forcing the input to the program/erase voltage switch (i.e., the VPEN input) to a LOW logic state. At this point, the method continues with waiting to detect further attempts to write to the protected area (block 115).

Figure 2:
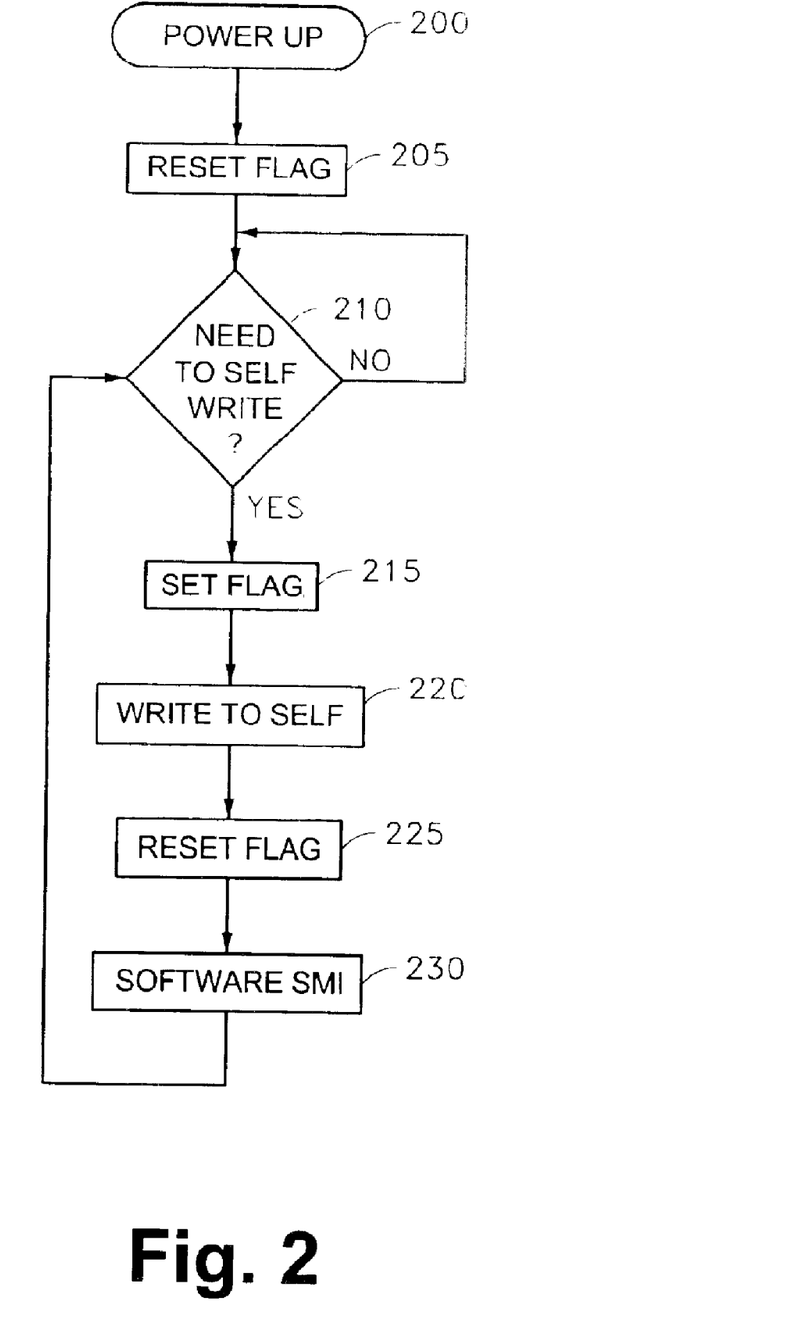
FIG. 2 is a flow chart diagram illustrating a first portion of a specific implementation of the method for controlling access to a protected area of a memory.
Figure 3:
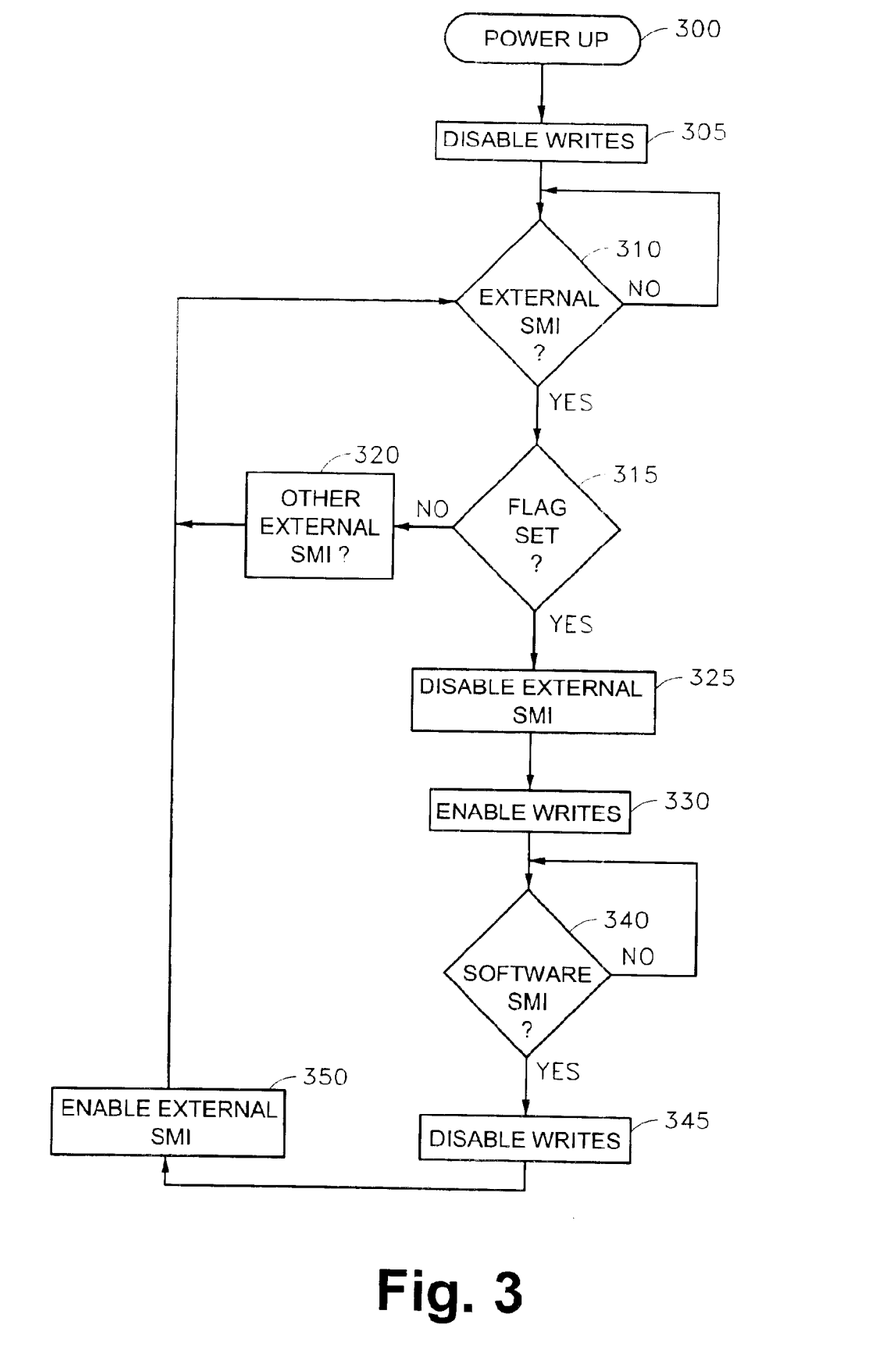
FIG. 3 is a flow chart diagram illustrating a second portion of a specific implementation of the method for controlling access to a protected area of a memory.

Reference is now made to FIGS. 2 and 3, which are flow chart diagrams illustrating separate portions of a specific implementation of the method for controlling access to a protected memory area. In these examples, it will be observed by those skilled in the art that the method shown in FIG. 2 may be executed as a first series of instructions located in the protected memory area, for example, and that the method shown in FIG. 3 may be executed as a second series of instructions located in another memory area, such as a Dynamic Random Access Memory (DRAM) readily accessible to a microprocessor (which is normally fabricated so as to be physically separated from the protected memory).

Thus, in FIG. 2, which may constitute a series of instructions residing in a protected area of a flash memory as part of a boot loader and/or ROS, the method begins with the application of power to the memory (block 200). After the memory is powered-up, the write authorization flag is typically reset (block 205). In this case, the write authorization flag is typically located in a non-volatile memory area separate from the protected memory. For example, an unused bit in the real-time clock register of a microprocessor system can be designated to maintain the state of the flag. To reset the flag, the bit can be cleared, i.e., a value of "zero" is assigned to the bit. For the purposes of the invention, an unused, non-volatile register bit is ideal for maintaining the state of the flag, since the value of the bit will remain the same even after power is no longer applied to the rest of the computer system. In the exemplary case of the real-time clock register bit, this is because the real-time clock is usually powered by a battery so that the clock is always "on" in order to maintain a current time value. However, as a precautionary measure, the write authorization flag may be reset every time power is applied to the memory, as part of the boot loader initialization process, for example.

The software instructions within the protected area of memory make a determination as to whether there is a need to write to the protected area (block 210). If not, then no action need be taken. However, if the need to write to the protected area arises, as determined by the instruction set residing within the protected area, then the write authorization flag will be set (block 215). If the real-time clock register bit previously described is used to carry the state of the flag, then the bit may be set by assigning a value of "one" to the bit.

After the write authorization flag is set, then writes to the protected memory will be enabled (as described below), and one or more write operations to the protected memory area which occur in block 220 will be effective. Once the write operations are completed, the flag will be reset in block 225 (e.g. by clearing the otherwise unused non-volatile real-time clock register bit).

To inform the system processor that write operations to the protected area have been completed, a preselected interrupt can be triggered or generated by the instruction set residing within the protected area in block 230. For example, in an Intel Pentium® II microprocessor system (using a central processor similar to or identical to the Intel A8050266166), a System Management Interrupt (SMI) may be generated using software instructions recorded in the upper one-megabyte area of a flash memory which has been designated as the protected memory area. In such a system, the instructions may actually be executed out of DRAM by the processor, after the instructions are copied to the DRAM from the flash memory. At this point, write operations to the protected memory will have been completed, and the method shown in FIG. 2 continues with block 210, waiting until it is again necessary to write to the protected area.

In FIG. 3, which may constitute a series of instructions which are part of an initialization routine, interrupt service routine, or System Management Mode (SMM) routine executed by a central processing unit, the method may begin with the application of power to the processor in block 300. In this exemplary case, the instruction set typically resides in a microprocessor system DRAM memory which is physically separate from the protected memory area. After the processor and memory are powered-up, write operations to the protected memory area are disabled in block 305. As noted above, this can be accomplished by holding the input to the program/erase voltage switch (i.e., the VPEN input) in a logic LOW state in the exemplary case of a protected memory area located within a flash memory, similar to or identical to the Intel 28F128J3.

The method continues in block 310 with determining whether an attempt has been made to write to the protected memory area. For example, this may occur, as is well known to those skilled in the art, by detecting activation of a plurality of signal lines connected to the memory. This may include simultaneously detecting activation of a plurality of address lines connected to the memory and at least one access enabling line connected to the memory. Using the Intel 28F128J3 flash memory as an example, this may be accomplished if a subset of the upper address lines connected to the memory (e.g., A20, A21, A22, and A23), along with the VPEN line, are monitored for activity. If all of these selected lines are active, and connected to the input of a logic gate, such as an AND or NAND gate, an interrupt line to the processor, such as an External SMI (EXTSMI) line for the exemplary Intel A8050266166 described above, can be activated by the output of the gate, and connected directly to the EXTSMI input of the processor.

If no EXTSMI interrupt is triggered in block 310, then the method simply continues to wait for the interrupt. However, when the EXTSMI (or some other equivalent interrupt) is detected by the processor in block 310, the method continues with block 315 to determine whether the write authorization flag has been set. If the flag is not set, then the processor may, optionally, seek to determine other sources of the EXTSMI interrupt in block 320. Alternatively, the method may simply continue with waiting for the next occurrence of the EXTSMI interrupt in block 310. It should be noted that those skilled in the art will realize that many other equivalent devices to the EXTSMI interrupt (such as other interrupts, or hardware/software logic state changes) may be used to alert the processor to the occurrence of attempted write operations to the protected memory area. Also, it should be noted that while it is not absolutely necessary, for additional security and as part of a truly robust system, the preferred implementation of the method of the invention includes selecting a memory location for maintaining the state of the flag which is physically separate from the memory used to contain the instructions which are executed to implement the method shown in FIG. 3. If the write authorization flag is determined to be set in block 315, then the method continues with block 325, wherein the EXTSMI interrupt is disabled by the processor. In this exemplary case, disabling the interrupt is necessary to ensure that future (authorized) write operations to the protected memory area do not continue to trigger the EXTSMI interrupt service routine.

At this point, in block 330, write operations to the protected area are enabled. As mentioned above, in the exemplary case of a protected memory area located within an Intel 28F128J3 flash memory, this may be accomplished by either actively moving the input to the program/erase voltage switch (i.e., the VPEN input) to a HIGH state, or passively allowing the VPEN input to be moved to a HIGH state. In either case, one or more write operations may then proceed, until all writes to the protected area are completed, as determined in block 340, where for example, the completion of write operation activity can be detected by using the instructions resident within the protected area to trigger a particular type of interrupt, such as an SMI interrupt. Until the SMI interrupt is triggered, write operations to the protected area are allowed to continue in block 340. However, once the SMI interrupt is triggered, write operations are disabled in block 345. Again, to use the example of the Intel 28F128J3 flash memory, this may be accomplished by preventing the input to the program/erase voltage switch (i.e., the VPEN input) from moving to a HIGH state. At this point, the method continues with block 350 by re-enabling the EXTSMI interrupt, and going on to block 310, waiting to detect further attempts to write to the protected area. Again, as will be appreciated by those skilled in the art, many other equivalent devices to the SMI interrupt (such as other interrupts, or hardware/software logic state changes) may be used to alert the processor to the completion of authorized write operations to the protected memory area.

It will be understood by those of ordinary skill in the art that the embodiments shown in FIGS. 1–3 illustrate several methods of implementing the novel mechanism of controlling access to a protected memory area disclosed herein. The invention, embodied in a method, includes detecting an attempt to write to the protected area, determining whether a write authorization flag has been set by software located in the protected area, and, if the flag has been set, enabling the attempted write operation. Thus, one of ordinary skill in the art will understand upon reading this description that the method of the present invention can be used in applications other than those outlined with respect to the exemplary components described above, and indeed, using components other than DRAMs, flash memories, and central processing units, and thus, the invention is not to be so limited. The illustrations of methods in FIGS. 1, 2, and 3, are intended to provide a general understanding of some applications which may be served by the present invention, and are not intended to serve as a complete description of all the elements and features of methods which make use of the novel protected memory access control mechanism described herein.

Applications which may include the novel memory access control mechanism as described in this document include electronic circuitry used in high-speed computers, arrays of memory modules and other circuit cards, device drivers, power modules, communication circuitry, modems, processor modules, memory integrated circuits, embedded processors, set-top clients, networked client-server systems, and application-specific modules, including multilayer, multi-chip modules. Such circuitry may further be included as sub-components within a variety of electronic systems, such as televisions, cellular telephones, personal computers, aircraft, and others.

FIGS. 1–3 are similarly useful in presenting the application of hardware circuitry which may be constructed according to the teachings of the present invention. Those of ordinary skill in the art will realize that various circuits, apparatus, and systems may be assembled and used in accordance with the methods described in the various figures. However, for clarity, several embodiments of circuitry, apparatus, and systems constructed according to the teachings of the present invention will be specifically illustrated.

Figure 4:
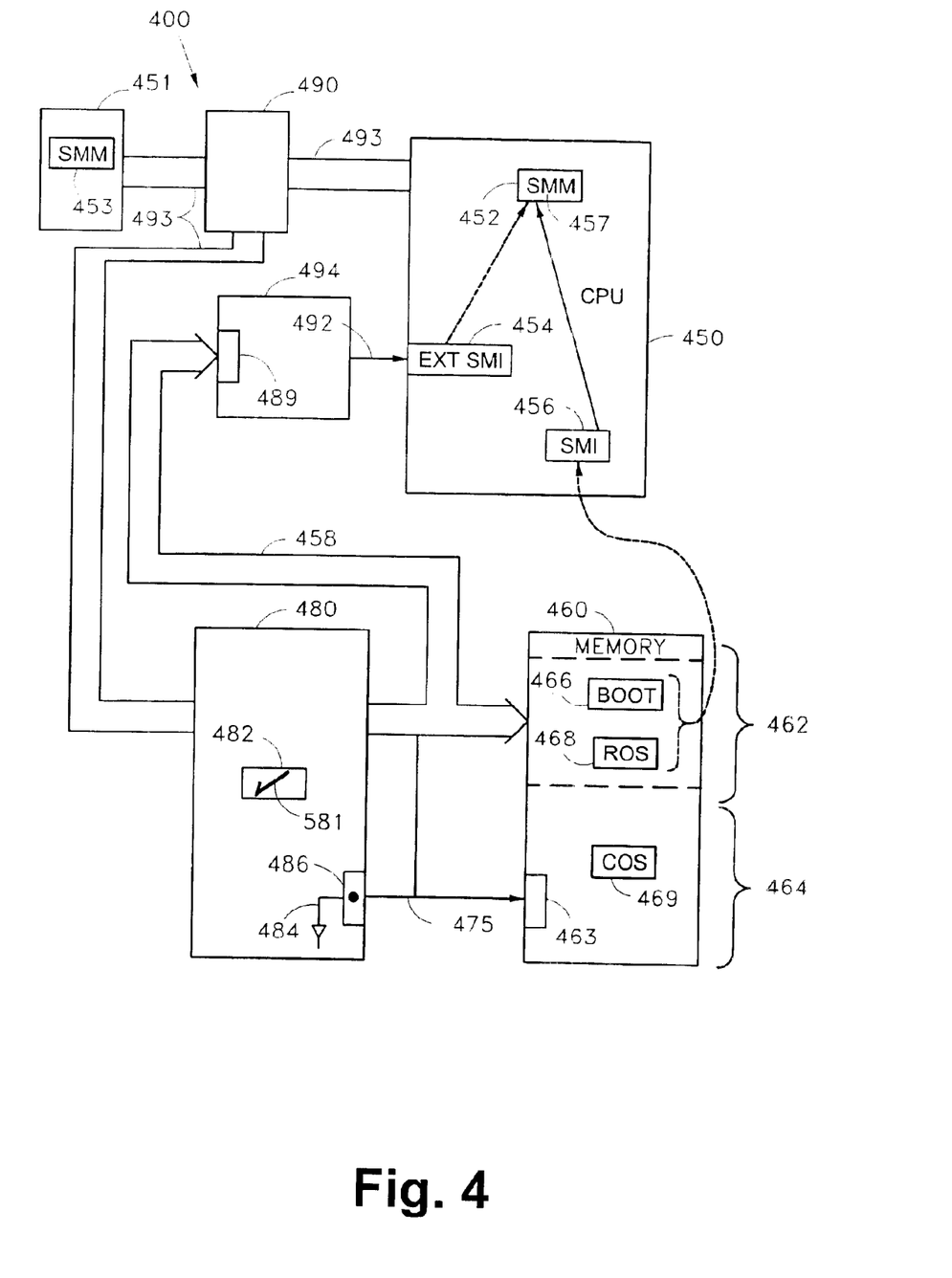
FIG. 4 is schematic block diagram of a circuit for controlling access to a protected area of a memory constructed according to the teachings of the present invention.

Referring now to FIG. 4, a schematic block diagram of a circuit for controlling access to a protected area of a memory constructed according to the teachings of the present invention can be seen. The memory access control circuit 400 may include, for example, a memory 460 having a protected area 462. A first set of instructions to set the state of the write authorization flag and to write to the protected area 462 is stored in the protected area 462, perhaps as part of a boot loader 466 or a ROS 468. As noted above, the first set of instructions may actually be executed out of a DRAM or other memory, after being copied from the memory 460 as part of an initialization process. Of course, the memory 460 may also have an unprotected area 464, in which other software instructions, such as a Client Operating System (COS) 469 are stored. The memory 460, which may be similar to or identical to an Intel 28F128J3 flash memory, includes an access enabling line input 463, which may be similar to or identical to the input to the program/erase voltage switch (i.e., the VPEN input) of the Intel 28F128J3.

The memory access control circuit 400 also includes a write detection module 494 that has an output 492 to indicate an attempt to write to the protected area 462. For example, the write detection module 494 may be a part of a processor module 450, or a separate circuit, such as an individual NAND gate. For example, if the address line inputs A20, A21, A22, and A23 and the VPEN input for an Intel 28F128J3 flash memory 460 are connected to the write detection module input, such as a NAND gate input 489 in the write detection module 494, any attempt to write to the upper 512 Kbytes of the address space within the memory 460 will be indicated by transition to a LOW logic level at the module 494 NAND gate output 492. Typically, this output 492 will be connected to an interrupt input 454, such as the EXTSMI interrupt input 454 of the processor module 450 (which may be similar to or identical to an Intel Pentium®II microprocessor, such as the Intel A8050266166). Of course, those skilled in the art will realize that the write detection module 494 may be constructed as an integral part of the processor module 450, or as a separate integrated circuit package, as desired.

The processor module 450 is connected, directly or indirectly, to the access enabling line 475, and in turn, to the access enabling line input 463 of the memory 460. Such a connection may be effected, for example, via address and control lines 493 which connect the processor module 450 to a general purpose controller module 480, which may be similar to or identical to an Intel 82371AB PIIX4 multi-function device. The access enabling line input 463 may be similar to or identical to the Intel 28F128J3 flash memory program/erase voltage switch input (i.e., the VPEN input), and may be controlled so as to enable or disable write operations to the protected area 462 by forcing the access enabling line 475 to a LOW logic state 484 using the instruction set 457 in the processor module 450 to activate the requisite address and control lines 493 to cause an output 486 (such as the GPO9 output of the Intel 82371AB PIIX4 multifunction device) connected to the enabling access line 475 to go to a LOW logic state. As described previously, the processor module 450 includes an interrupt input 454 connected to the output of the write detection module 490. In order to detect completion of one or more authorized write operations to the protected memory area 462, the processor module 450 may include an interrupt 456, similar to or identical to a software SMI interrupt 456 which is operationally connected to the set of instructions 466, 468 executed within the protected memory area. (i.e., software instructions, hardware logic state transitions, or a combination of software and hardware may be used by the instruction set 466, 468 to trigger the SMI interrupt 456).

The memory access control circuit 400 also includes a memory 452 with a set of instructions 457, such as an SMM routine 457 in operational communication with the interrupt inputs 454 and 456. The instruction set 457 is adapted to activate an output indicating the state of the flag 481, which may be located in yet another memory 482, such as an unused non-volatile real-time clock register bit within the general purpose controller module 480. It should be noted that the memory 452 may be an integral part of the processor module 450 as shown in FIG. 4, or optionally, the memory 451 with the second set of instructions 453 for determining the state of the flag 481 may be located externally, by using a separate DRAM 451 connected to the processor module 450 using the address and control lines 493, coupled to the processor module 450 using an Intel 82443ZX host bridge controller 490, for example. In any case, the memory 482 is in operational communication with the set of instructions 466, 468 located in the protected memory area 462.

Figure 5:
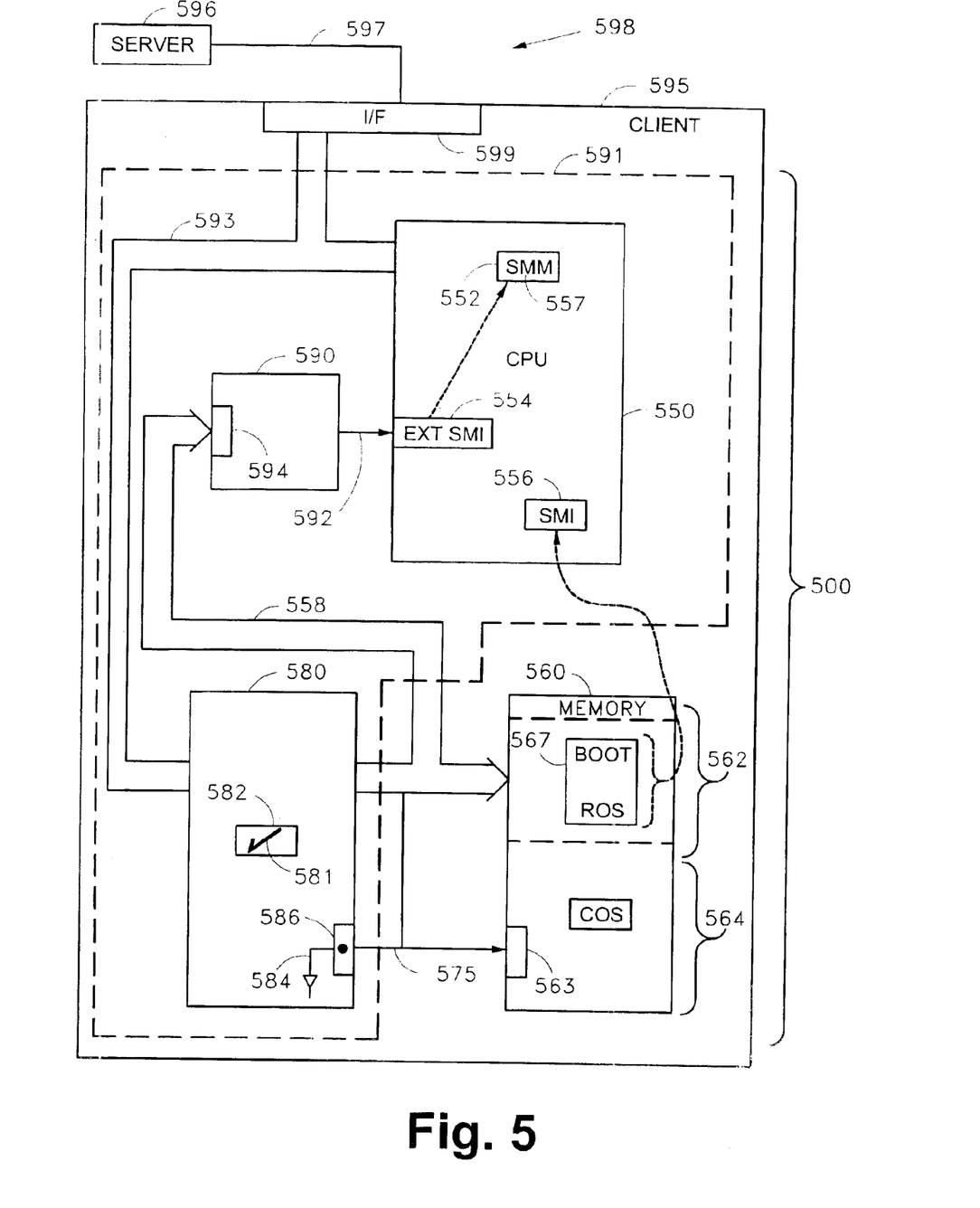
FIG. 5 is an apparatus and a system for controlling access to a protected area of a memory constructed according to the teachings of the present invention.

Turning now to FIG. 5, an apparatus and system for controlling access to a protected area of a memory constructed according to the teachings of the present invention can be seen. The apparatus 595 may be a set-top client 595, which includes a network interface 599 operationally connected (i.e. via software, hardware, or a combination of software and hardware) to a memory access control circuit 500 constructed according to the teachings of the present invention. Thus, the memory access control circuit may include a memory 560 having a protected area 562. A set of instructions 567 to set the state of the write authorization flag and to write to the protected area 562 is stored in the protected area 562, and may be copied to a DRAM or other memory for actual execution, as mentioned previously. The memory 560 may also have an unprotected area 564, in which other software instructions are stored. The memory 560, which may be similar to or identical to an Intel 28F128J3 flash memory includes an access enabling line input 575, which may be similar to or identical to the input to the program/erase voltage switch (i.e., the VPEN input) of the Intel 28F128J3.

The memory access control circuit 500 also includes a write detection module 590 that has an output 592 to indicate an attempt to write to the protected area 562. For example, the write detection module may be a part of a processor module 550, or a separate circuit, such as a NAND gate located within a programmable logic device (PLD) or an application specific integrated circuit (ASIC). In this case, for example, if the address line inputs A20, A21, A22, and A23 and the VPEN input for an Intel 28F128J3 flash memory 560 are connected to the write detection module input 594, such as a NAND gate input 594 in the write detection module 590 (which may be a PLD, ASIC, or any other device which includes the necessary logic to detect attempts to write to the memory 560), any attempt to write to the upper 512 Kbytes of the address space within the memory 560 will be indicated by transition to a LOW logic level at the output 592. Typically, this output 592 will be connected to an interrupt input 554, such as the EXTSMI interrupt input 554 of the processor module 550 (which may be similar to or identical to an Intel Pentium®II microprocessor, such as the Intel A8050266166). From the preceding discussion, those skilled in the art will realize that the processor module 550, the write detection module 590, and the memory 552 may all be included in a single integrated module 591, which is also the case for like numbered elements 450, 490, and 452 shown in FIG. 4.

The processor module 550 is connected, directly or indirectly, to the access enabling line 575, and in turn, to the access enabling line input 563 of the memory 560. Such a connection may be effected for example, via address and control lines 593 which connect the processor module 550 to a general purpose controller module 580, which may be similar to or identical to an Intel 82371AB PIIX4 multi-function device. The access enabling line input 563 may be similar to or identical to the Intel 28F128J3 flash memory program/erase voltage switch input (i.e., the VPEN input), and may be controlled so as to enable or disable write operations to the protected area 562 by forcing the access enabling line 575 to a LOW logic state 584 using the instruction set 557 in the processor module 550 to activate the requisite address and control lines 593 to cause an output (such as the GPO9 output of the Intel 82371AB PIIX4 multifunction device) connected to the enabling access line 575 to go to a LOW logic state. As described previously, the processor module 550 includes an interrupt input 554 connected to the output of the write detection module 590. In order to detect completion of one or more authorized write operations to the protected memory area 562, the processor module 550 may include an interrupt, similar to or identical to a software SMI interrupt 556 which is operationally connected to the set of instructions 567 executed within the protected memory area. (ie., software instructions, hardware logic state transitions, or a combination of software and hardware may be used by the instruction set 567 to trigger the SMI interrupt 556).

The memory access control circuit 500 also includes a memory 552 with a set of instructions 557, such as an SMM routine, in operational communication with the interrupt input 554. The instruction set 557 is adapted to determine the state of the flag 581, which may be located in yet another memory 582, such as an unused non-volatile real-time clock register bit within the general purpose controller module 580. It should be noted that the memory 552 may be constructed as an integral part of the processor module 550 as shown in FIG. 4, or optionally, the memory 552 may be located externally (not shown in FIG. 5; see FIG. 4), such as for a separate DRAM connected to the processor module 550 using the address and control lines 593 and any necessary bridge/control circuitry. In any case, the memory 582 is in operational communication with the set of instructions 567 located in the protected memory area 562.

In addition, FIG. 5 illustrates a networked system 598 for controlling access to a protected area 562 of a memory 560. The networked system 598 includes a server 596 and a network 597 connected to the server. The server may be similar to or identical to an Intel L440GX+ server board mounted in an Intel SC5000 chassis, and the network may be, for example, a company-wide intranet, or a global telecommunications network, such as the Internet™. The set-top client 595, previously described, is also connected to the network 597, and is included as an element of the networked system 598.

Thus, the present invention provides a novel mechanism for controlling access to a protected memory area as embodied by various methods, circuitry, apparatus, and systems. The invention obviates the need for special lock-down mechanisms in flash memories to protect areas within such memories, and provides robust techniques that can be implemented using software, hardware, or a combination of software and hardware, enabling an instruction set contained within a protected memory area to have sole control over all write operations directed to that area of memory. Of course, the invention can also be used in addition to flash memory lock-down access control mechanisms, providing increased security.

Although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein, will be apparent to those of skill in the art upon reviewing the above description.

The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. An article comprising a machine-accessible medium having associated data, wherein the data, when accessed, results in a machine performing:

detecting an attempted write operation to a protected area of a memory including a first set of instructions;

using a second set of instructions not located in the memory to determine that an authorization flag not located in the memory has been set by the first set of instructions; and if the authorization flag has been set, enabling the attempted write operation.

2. The article of claim 1, wherein detecting an attempted write operation to the protected area includes:

detecting activation of at least two signal lines connected to the memory.

3. The article of claim 2, wherein detecting activation of the at least two signal lines connected to the memory includes:

simultaneously detecting activation of at least one address line connected to the memory and at least one access enabling line connected to the memory.

4. The article of claim 1, wherein detecting an attempted write operation to the protected area includes:

activating an interrupt line connected to a processor.

5. The article of claim 1, wherein the second set of instructions and the authorization flag are located in another memory.

6. The article of claim 1, wherein the second set of instructions is located in another memory, and wherein the authorization flag is not located in the other memory.

7. The article of claim 1, wherein using a second set of instructions not located in the memory to determine that an authorization flag not located in the memory has been set by the first set of instructions includes:

determining a value of a bit not located in the memory.

8. The article of claim 1, wherein enabling the attempted write operation includes:

activating at least one access enabling line connected to the memory.

9. The article of claim 8, wherein detecting an attempted write operation to the protected area includes:

simultaneously detecting activation of at least one address line connected to the memory and the at least one access enabling line connected to the memory.

10. The article of claim 1, wherein the data, when accessed, results in the machine performing:

detecting that the attempted write operation has been completed.

11. The article of claim 10, wherein detecting that the attempted write operation has been completed includes:

detecting an occurrence of a software interrupt.

12. The article of claim 10, wherein the data, when accessed, results in the machine performing:

disabling a future write operation to the protected area.

13. The article of claim 12, wherein disabling the future write operation to the protected area includes:

deactivating at least one access enabling line connected to the memory.

14. The article of claim 1, wherein the data, when accessed, results in the machine performing:

otherwise, if the authorization flag has not been set, refraining from enabling the attempted write operation.

15. An apparatus, comprising:

a first memory having a protected area including a first set of instructions to set a state of a flag and to write to the protected area, the first memory including an access enabling line;

a write detection module having an output coupled to an interrupt to indicate an attempt to write to the protected area; and a second memory including a second set of instructions in operational communication with the interrupt, the second set of instructions adapted to determine the state of the flag.

16. The apparatus of claim 15, further comprising:

a third memory in operational communication with the second set of instructions, wherein the third memory includes the flag.

17. The apparatus of claim 15, wherein the write detection module and the second memory are included in a single integrated module.

18. The apparatus of claim 15, wherein the first memory comprises a flash memory.

19. An apparatus, comprising:

a network interface; and a memory access control circuit operationally connected to the network interface, the memory access control circuit including a first memory having a protected area including a first set of instructions to set a state of a flag and to write to the protected area, the first memory including an access enabling line, a write detection module having an output coupled to an interrupt to indicate an attempt to write to the protected area, and a second memory including a second set of instructions in operational communication with the interrupt, the second set of instructions adapted to determine the state of the flag.

20. The apparatus of claim 19, wherein the access enabling line is operationally coupled to a processor.

21. The apparatus of claim 19, wherein the write detection module is included in a circuit.

22. The apparatus of claim 21, wherein the circuit is a processor.

23. A system, comprising:

a server; and an apparatus capable of being coupled to the server, the apparatus including a first memory having a protected area including a first set of instructions to set a state of a flag and to write to the protected area, the first memory including an access enabling line, a write detection module having an output to indicate an attempt to write to the protected area, and a second memory including a second set of instructions in operational communication with the write detection module, the second set of instructions, upon execution, capable of determining the state of the flag.

24. The system of claim 23, wherein the apparatus is a set-top client.

25. The system of claim 23, wherein the server is coupled to the apparatus with a network.

* * * * *